United States Patent
Lowery

(10) Patent No.: US 10,574,734 B2
(45) Date of Patent: Feb. 25, 2020

(54) DYNAMIC DATA AND COMPUTE MANAGEMENT

(71) Applicant: Rambus Inc., Sunnyvale, CA (US)

(72) Inventor: Keith Lowery, Garland, TX (US)

(73) Assignee: Rambus Inc., Sunnyvale, CA (US)

( * ) Notice: Subject to any disclaimer, the term of this patent is extended or adjusted under 35 U.S.C. 154(b) by 386 days.

(21) Appl. No.: 15/080,371

(22) Filed: Mar. 24, 2016

(65) Prior Publication Data

US 2016/0301742 A1    Oct. 13, 2016

Related U.S. Application Data

(60) Provisional application No. 62/194,105, filed on Jul. 17, 2015, provisional application No. 62/145,303, filed on Apr. 9, 2015.

(51) Int. Cl.
*H04L 29/08* (2006.01)

(52) U.S. Cl.
CPC ................... *H04L 67/10* (2013.01)

(58) Field of Classification Search
USPC .......................................................... 709/201
See application file for complete search history.

(56) References Cited

U.S. PATENT DOCUMENTS

| | | | | |
|---|---|---|---|---|
| 5,802,290 A * | 9/1998 | Casselman | .......... | G06F 9/30181 703/21 |
| 7,506,020 B2 * | 3/2009 | Ellis | .......... | A01N 25/30 709/201 |
| 8,024,740 B2 | 9/2011 | Kawato | | |
| 8,327,373 B2 | 12/2012 | Srinivasan | | |
| 9,602,427 B2 * | 3/2017 | Patel | ........ | H04L 67/10 |
| 2008/0263323 A1 * | 10/2008 | Mould | ........ | G06F 9/3836 712/42 |
| 2012/0054763 A1 | 3/2012 | Srinivasan | | |
| 2012/0198073 A1 | 8/2012 | Srikanth et al. | | |
| 2013/0091508 A1 | 4/2013 | Srinivasan | | |
| 2013/0152047 A1 * | 6/2013 | Moorthi | ........ | G06F 11/368 717/124 |
| 2013/0173804 A1 | 7/2013 | Murthy et al. | | |
| 2013/0268940 A1 | 10/2013 | Gmach et al. | | |
| 2015/0081389 A1 * | 3/2015 | Dereszynski | ...... | G06Q 30/0204 705/7.33 |

OTHER PUBLICATIONS

Li, Haoyuan et al., "Tachyon: Reliable, Memory Speed Storage for Cluster Computing Frameworks", published at System on Chip Conference (SoCC'14), Nov. 3-5, 2014, 15 pages.

Putnam, Andrew et al., "A Reconfigurable Fabric for Accelerating Large-Scale Datacenter Services", 41st International Symposium on Computer Architecture (ISCA), 2014. pp. 13-24, Jun. 14-18, 2014, 12 pages.

* cited by examiner

*Primary Examiner* — Brian Whipple
*Assistant Examiner* — John Fan
(74) *Attorney, Agent, or Firm* — Lowenstein Sandler LLP

(57) ABSTRACT

Methods and systems for managing data storage and compute resources. The data can be stored a multiple locations allowing compute operations to be performed in a distributed manner in one or more locations. The cloud storage and cloud compute resources can be dynamically scaled based on the locations of the data and based on the cloud storage and/or cloud computing budgets. Dynamic reconfiguration of reconfigurable processors (e.g., FPGA) can further be used to accelerate compute operations.

20 Claims, 7 Drawing Sheets

DYNAMIC DATA AND COMPUTE MANAGEMENT

CROSS REFERENCE TO RELATED APPLICATIONS

This application claims the benefit of and priority to the commonly owned, provisional patent application, U.S. Ser. No. 62/145,303, entitled "GENERALIZED MEMORY POOL AND TRAFFIC MANAGEMENT HUB SUPPORTING COMPUTATIONAL SCALING," with filing date Apr. 9, 2015, which is herein incorporated by reference in its entirety.

This application claims the benefit of and priority to the commonly owned, provisional patent application, U.S. Ser. No. 62/194,105, entitled "DYNAMIC DATA AND COMPUTE MANAGEMENT," with filing date Jul. 17, 2015, which is herein incorporated by reference in its entirety.

BACKGROUND

Increasingly, larger amounts of information are being stored and processed by computing systems. At a base level, these computing systems are configured with one or more processors, each controlling access to corresponding memory. However, efficient use of resources with such large amounts of information can be challenging.

BRIEF DESCRIPTION OF THE DRAWINGS

Further aspects of the present disclosure will become apparent from the following description which is given by way of example only and with reference to the accompanying drawings in which.

DETAILED DESCRIPTION

Figure 1:
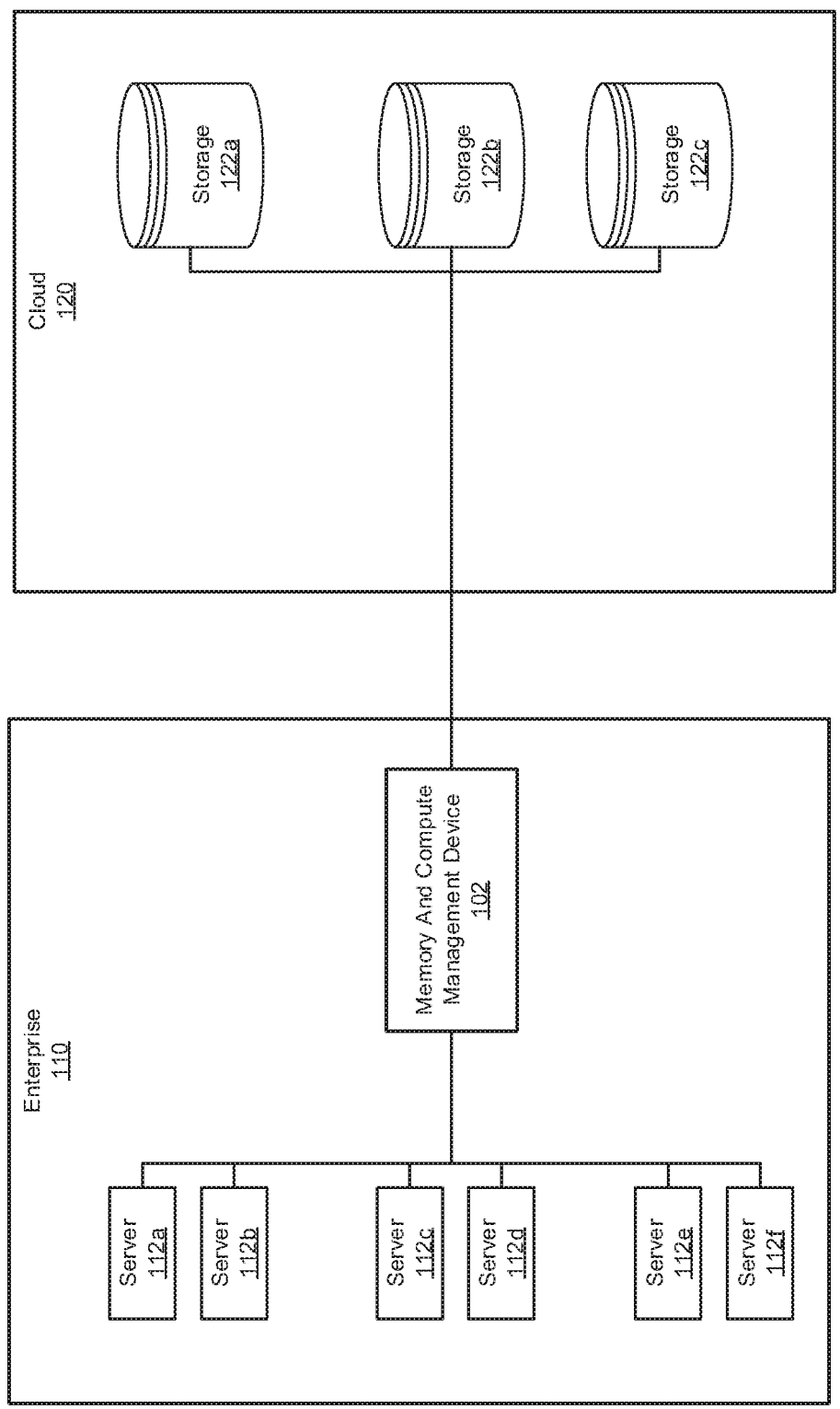
FIG. 1 shows an exemplary operating environment of a memory and compute management device, in accordance with various embodiments.

Reference will now be made in detail to the various embodiments of the present disclosure, examples of which are illustrated in the accompanying drawings. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The Figures illustrate example components used by various embodiments. Although specific components are disclosed in the Figures, it should be appreciated that such components are exemplary. That is, embodiments are well suited to having various other components or variations of the components recited in the Figures. It is appreciated that the components in the Figures may operate with other components than those presented, and that not all of the components of the Figures are required to achieve the goals of embodiments.

The shift from enterprise to cloud computing involves a shift, among other things, from fixed costs to variable costs. The movement is to variable cost for resource utilization that companies do not currently measure on their fixed infrastructure. For example, disk IOPs, egress network bandwidth, etc. are not traditional resource utilization measures used within companies for their internal equipment. The migration to the cloud can thus involve cost uncertainty.

The variable cost property of public clouds creates a motivation for dealing with visibility and management of cloud computing costs. With enterprise distributed storage, the capital costs, network costs, and storage costs are fixed. However, clouds, including hybrid and public clouds, are variable cost, e.g., per byte, per IOP, etc. Use of a cloud allows elastic provisioning which can address aspects of the problems of over provisioning and low utilization. Use of the cloud can also reduce enterprise operational overhead and enterprise capacity planning risk. However, cloud computing utilization is difficult to optimize in terms of cost. For example, customers of cloud providers can be charged per GB storage per month, per Input/Output Operations Per Second (IOPS), and per byte transferred over the network.

Cloud providers can offer a variety of web service storage application programming interfaces (APIs). For example, OpenStack offers its own object storage web service API (SWIFT) while software offers scale-out distributed file systems (e.g., Hadoop Distributed File System (HDFS)).

Hardware support for virtualization has enabled an entire business model and marketplace for cloud computing. Instead of provisioning servers in a fixed and inflexible way, virtual machines introduce the opportunity to share physical resources and rapidly repurpose and reuse physical resources across a wider range of workloads. This type of resource management and provisioning can be referred to as "elastic computing," which allows the opportunity to scale on-demand rather than pre-staging fixed infrastructure to satisfy peak expected capacity needs. In some areas of elastic computing, lightweight isolation features of operating systems are leveraged to facilitate elastic provisioning using much lighter containers than virtual machines. These lighter weight containers are often simpler and faster than provisioning using full-on virtualization.

Much of the motivation behind the development in elastic computing is related to the inefficient capital utilization represented by underused servers in data centers. The capital inefficiency of enterprise scale infrastructures may be a minimal concern, but companies doing web scale computing that are building multi-billion dollar data centers encounter large costs related to inefficient utilization.

At the same time automated provisioning and rapid repurposing delivers capital efficiency benefits within large data centers, the amount of data being processed by these data centers is growing. Hadoop software combines capabilities for scaling data storage with the ability to partition computation against that data across clusters of machines. Hadoop combines a distributed file system with a resource management and compute processing facility to process large amounts of data on arbitrarily sized clusters.

The distributed file system embedded in Hadoop is illustrative of one of the challenging problems in managing the kinds of data sets being produced in many systems; systems can be inefficient and often have bottlenecks related to managing the huge metadata associated with, for example, peta-scale file systems. Not only can such distributed file systems have these kinds of bottlenecks, but the amount of data in a growing number of applications is so large that it may not be able to be read from storage in a reasonable amount of time apart from deploying a solution that scales I/O in proportion to the actual data sizes involved.

As a result, a growing number of systems are increasingly employing more of an object storage architecture, in which the implementation details of the object storage system are abstracted and encapsulated by a storage service web API. This architectural approach allows multi-purpose storage services to be constructed, a looser coupling of applications to the actual storage service implementation, and a great deal of flexibility on the part of the storage service for how it resolves some of the fundamental dilemmas involved.

The implementation of these storage services often involves a tiered architecture in which differing storage technologies are employed at different layers of the tiered architecture. Tiers closest to the client systems in the layered architecture may offer more performant storage technology (e.g., SSD) than those tiers further away (e.g., HDD) because the storage system keeps newer data closer to client systems due to an application's affinity for temporal locality. It is easy to imagine a storage architecture for massive data in which the most frequently accessed data is located in more performant tiers than the least frequently accessed data.

So the situation is that systems for managing the provisioning of resources are combined with storage services to solve some of fundamental problems with computing at these massive scales. Any provisioning or resource allocation system has to consider whether existing approaches to computing in which the data is brought to the computation is really effective at these scales. It may be more efficient to ship the software to a location near the data than it is to push the data that is being processed. So sophisticated systems can combine an awareness of how data is spread across a distributed storage system with the ability to package up computational code and ship such packages to the storage nodes themselves to perform computation closest to the data itself. The advantages of this approach are many, not the least of which is that it eliminates much of the network saturation that would ensue if all of the data was sent across the network each time a different analysis is applied.

Both Hadoop and its Apache similar software known as "Spark" can be designed to enable computer systems to behave in these ways in which software to be used for any given analytical effort is shipped to the various nodes of the cluster rather than shipping the data to the computation. This can allow these systems to linearly scale both in terms of I/O and computational capacity relative to the number of nodes within the cluster. It is noted that this shipping of software around is done at runtime and does not involve the traditional rigidities of having legacy software pre-installed.

Embodiments, therefore, can function as a manager of data storage and compute resource allocation. A transparent storage facility (e.g., inline) can be provided that improves efficiency and reduces variable cost exposure. In particular enterprise exposure to the variability of cloud computing costs can be mitigated.

The growth in the size of data sets being managed by computing systems outpaces the growth in the computational performance of CPUs. As a result, there is a growing amount of experimentation with the use of reconfigurable compute elements, like FPGAs, as a means of accelerating specialized computations within applications. Anticipating the use of FPGAs in cloud computing environments necessitates introducing new capabilities to manage, provision, and repurpose reconfigurable compute elements in the cloud.

The elastic provisioning capabilities of cloud computing can be combined with dynamic reconfiguration of reconfigurable processing elements such that images that are deployable in the cloud can be used, during Virtual Machine (VM) boot time, to reimage the reconfigurable processing elements of the memory and compute devices for use as an accelerator. The memory and compute devices can be loaded with data and a series of accelerators (e.g., compute kernels) which can be used to apply a series of transformations or analysis to the in-memory data sets. The dynamic runtime reconfiguration of reconfigurable processing elements of the memory and compute management device can introduce a substantially increased computational capacity that is in line with the substantial memory density of the memory and compute device.

The implementation of dynamic runtime reconfigurability to reconfigurable processing elements (e.g., FPGAs) facilitates the use of reconfigurable accelerators in distributed systems in line with the big data systems. A cloud computing infrastructure could be populated with the large memory devices and/or reconfigurable processor accelerator cards in commodity servers to achieve significant improvements in performance and total cost of ownership.

Embodiments include a memory and compute management device that functions as gateway for providing dynamic capacity of the cloud for both storage and compute in a manner that is transparent to the applications of an enterprise. The memory and compute management device can manage the enterprise's use of the cloud. The data can be persisted and/or copied to multiple locations and VMs can be spun up on the fly to scale the compute capacity to perform compute requests on the data. The need to provision large amounts of enterprise infrastructure for large compute jobs can be mitigated.

Embodiments further provide reconfigurable compute acceleration (e.g., FPGA) and substantial amounts of system-level memory (e.g., 10-12 TB) on a per node basis. The reconfigurable compute acceleration provides more efficient computational engines than can be achieved with general purpose processors. For example, FPGAs can be used as more efficient computational engines that can be reconfigured for higher performance and increased capital efficiency for specific workloads.

Dynamic Data and Compute Management

FIG. 1 shows an exemplary operating environment of a memory and compute management device, in accordance with various embodiments. FIG. 1 depicts an exemplary operating environment 100 for a memory and compute management device 102 that is configured to manage storage and performance of the compute operations over one or more devices. The operating environment 100 includes enterprise 110 and cloud 120.

The enterprise 110 includes servers 112a-f and the memory and compute management device 102. The servers 112a-f are coupled to the memory and compute management device 102. The servers 112a-f may be coupled to other devices that are not shown. The memory and compute management device 102 is coupled to associated storage elements 122a-c of the cloud 120. The storage elements 122a-c can include volatile storage, persistent storage, and processing elements (not shown).

The memory and compute management device 102 can include substantial amounts of memory (e.g., 1.5 TB-12 TB) and compute capacity. The memory and compute management device 102 can be configured to be located on the boundary between the enterprise 110 and cloud computing infrastructures of the cloud 120. The memory and compute management device 102 can be treated as a storage device and appear as a storage device to enterprise devices (e.g., the servers 112a-f). In some embodiments, the memory and compute management device 102 is a block storage device or an NFS device. The memory and compute management device 102 can be configured to perform loads and stores, configure accessing and manipulating data structures (e.g., lists), and accessing and manipulating of metadata.

The memory and compute management device 102 can receive data through distributed storage protocols of various types. The memory and compute management device 102 can then transfer the data (e.g., based on cloud resource budgets or configurations) to the cloud 120 and in particular storage elements 122a-c. The memory and compute management device 102 may use storage APIs with the cloud 120 to synchronize the data from enterprise applications into the cloud 120 as a backing store. The memory and compute management device 102 can thus sit between the enterprise and the cloud computing infrastructures and allow the use of the cloud computing infrastructure transparently. The applications executing in the enterprise 110 can thus interact with the memory and compute management device 102, while it is manages the backend storage, APIs, security, etc.

The memory and compute management device 102 can have substantial memory resources (e.g., 10-12 TB) and loading data of that size over a network could take a significant amount of time. As a result, the memory and compute management device 102 can be configured to manage computations and/or analytics on the data that is stored with the memory and compute management device 102 and stored within the cloud 120.

The memory and compute management device 102 is configured to track which data is local within the memory and compute management device 102 and data that has been sent and/or copied to the cloud 120. For example, a plurality of images can be loaded into the memory and compute management device 102 by an image serving service (e.g., one or more of servers 112a-f) and the memory and compute management device 102 can function as a database for each of the images. The memory and compute management device 102 can have the images stored in one or more of storage elements 122a-c in the cloud 120. If one of the servers 112a-f requests to have image recognition performed on the images, the server can send the software for performing the image recognition as part of a compute request. The memory and compute management device 102 can run the software locally based on one or more characteristics of the software that suggests the software should be run locally. The memory and compute management device 102 may further automatically scale computing capacity in the cloud 120 to run the image recognition software in the cloud 120 and/or a portion of image recognition locally within the memory and compute management device 102. For example, the memory and compute management device 102 can have a plurality of VMs spun up in the cloud 120 and transfer a copy of the image recognition software to the VMs to have the image recognition performed against a copy of the images stored in the cloud 120 (e.g., within a cloud based object store).

The memory and compute management device 102 can thus on-the-fly expand and contract compute capacity by initializing or spinning up VMs and terminating or shutting down VMs when the memory and compute management device 102 does not need the VMs for augmenting the compute capacity of the memory and compute management device 102 or other devices. The memory and compute management device 102 can conduct the movement of compute and resources that are used to perform compute tasks. The memory and compute management device 102 thus acts as conductor for the movement of data and computation in a large scale distributed system. Embodiments are thus able to advantageously automatically scale compute capacity in a distributed architecture (e.g., locally and in one or more clouds).

The memory and compute management device 102 can further manage reconfigurable computing. The reconfigurable computing can include the reconfiguration of one or more FPGAs. The memory and compute management device 102 can have one or more reconfigurable processing elements (e.g., FPGAs) which can be reconfigured on-the-fly at runtime to operate as a variety of different compute engines. In some embodiments, the reconfigurable processing elements of the memory and compute management device 102 can be reconfigured based on a bit file that is part of a compute request. For example, the bit file can be used to reconfigure a FPGA into a different kind of accelerator. The reconfigurable processing elements can thus be transformed into an accelerator or compute engine for a particular compute request and transformed into another type of compute engine for another compute request.

In some embodiments, the cloud 120 includes reconfigurable processing elements (e.g., reconfigurable hardware such as FPGAs). The memory and compute management device 102 may then reconfigure some of its reconfigurable processing elements and reconfigure the reconfigurable processing elements of the cloud 120 too (e.g., based on a bit file of a compute request). The reconfiguration of the processing elements can be based on standard or preconfigured bit files. Copies of the bit files can be stored in multiple locations and accessed as needed based on the compute request. For example, copies of the bit files local to the data may be used to reconfigure processing elements local to the data. The bit files can further be customized dynamically or on the fly based on the compute request. The memory and compute management device 102 can send a bit file to the cloud 120 and have VMs spun up to reimage the reconfigurable processing elements of the cloud 120 and perform the compute request. The memory and compute management device 102 can have a universal scaling engine that scales compute, data propagation, and reconfigurable compute resources.

The memory and compute management device 102 can thus intelligently reconfigure reconfigurable processing elements (e.g., FPGAs) on-the-fly. The memory and compute management device 102 can further intelligently reconfigure reconfigurable processing elements in a distributed context by sending configuration files (e.g., bit files) over one or more networks. A variety of security measures, including cryptography, can be used to secure and validate the configuration file (e.g., bit file). These security measures can be used when the configuration file is to be transmitted over untrusted networks. The memory and compute management device 102 is further configured to determine which reconfigurable processing elements that are local to the memory and compute management device 102 and which reconfigurable processing elements that are part of the cloud 120 should be reconfigured for performance of a compute request.

The memory and compute management device 102 can use a variety of storage APIs including, for example, Amazon (Simple Storage Service (S3), Elastic Block Store (EBS)), Azure storage services, OpenStack (e.g., SWIFT), Google Storage Services, and HDFS. The memory and compute management device 102 can function as an inline transparent device and provide caching, compression, I/O coalescing, and deduplication. The memory and compute management device 102 can be used with Hadoop and Apache Spark clients. The memory and compute management device 102 can transparently reduce the consumption of variable cost storage resources and improves effective I/O performance for remote storage. The memory and compute management device 102 can thus allow cloud operators to see reduced load and improved efficiency for their storage infrastructures.

In some embodiments, software executes on the memory and compute management device 102 to manage compute and memory resources of the memory and compute management device 102. The memory and compute management device 102 can function as a generalized memory pool and traffic management hub for in-memory distributed computing. The memory and compute management device 102 can support vertical computational scaling using hardware acceleration (e.g., processing elements, reconfigurable processing elements, etc.) and horizontal computational scaling using network attached servers and cloud computing to automatically scale compute capacity dynamically.

A compute kernel can include transformation, event processing, and persistence. The compute kernels can be executed in a variety of ways including, but not limited to, executed in hardware on a reconfigurable processing element (e.g., FPGA), in software on the memory and compute management device 102, in software on PCIe-attached nodes, in software on network-attached nodes, in software on network-attached cloud VMs, etc. The memory and compute management device 102 can use cloud APIs to automatically scale runtime compute capacity.

The compute kernels can be self-contained (e.g., fully), inclusive of user-supplied code. The compute kernels can include references to code residing at a specific location. For example, the location can include code that is local or remote in hardware or local or remote in software at a particular IP address or Internet location. The compute kernels can be transmitted between nodes as needed. In addition to purely software-based compute kernels, compute kernels may be encapsulated as bit-files usable by reconfigurable compute elements on compute nodes that have them.

Hardware-based compute kernels may execute on reconfigurable hardware (e.g., FPGAs) of the memory and compute management device 102. Software based compute kernels can be distributed between nodes as needed. The memory and compute management device 102 can make runtime decisions regarding whether to package lists/blobs and compute kernels for distributing to other nodes or to execute them locally. The compute kernel granularity can be global which is applied to each blob in the memory and compute management device 102, local which is applied to each blob contained in a specific list, or select which is applied to each blob matching a specific select criteria.

The functionality of the memory and compute management device 102 can provide a platform for distributed computation and hardware acceleration for in-memory data structures. This functionality can facilitate the packaging, distribution, and execution of compute kernels on in-memory data structures. In some embodiments, supplied compute kernels are supported in FPGA hardware and user-defined compute kernels are supported in Java and JavaScript. Hadoop and Apache Spark implementations can be applied to the in-memory data structures. Hardware acceleration can be exposed to a variety of applications (e.g., Hadoop and Apache Spark implementations).

Figure 2:
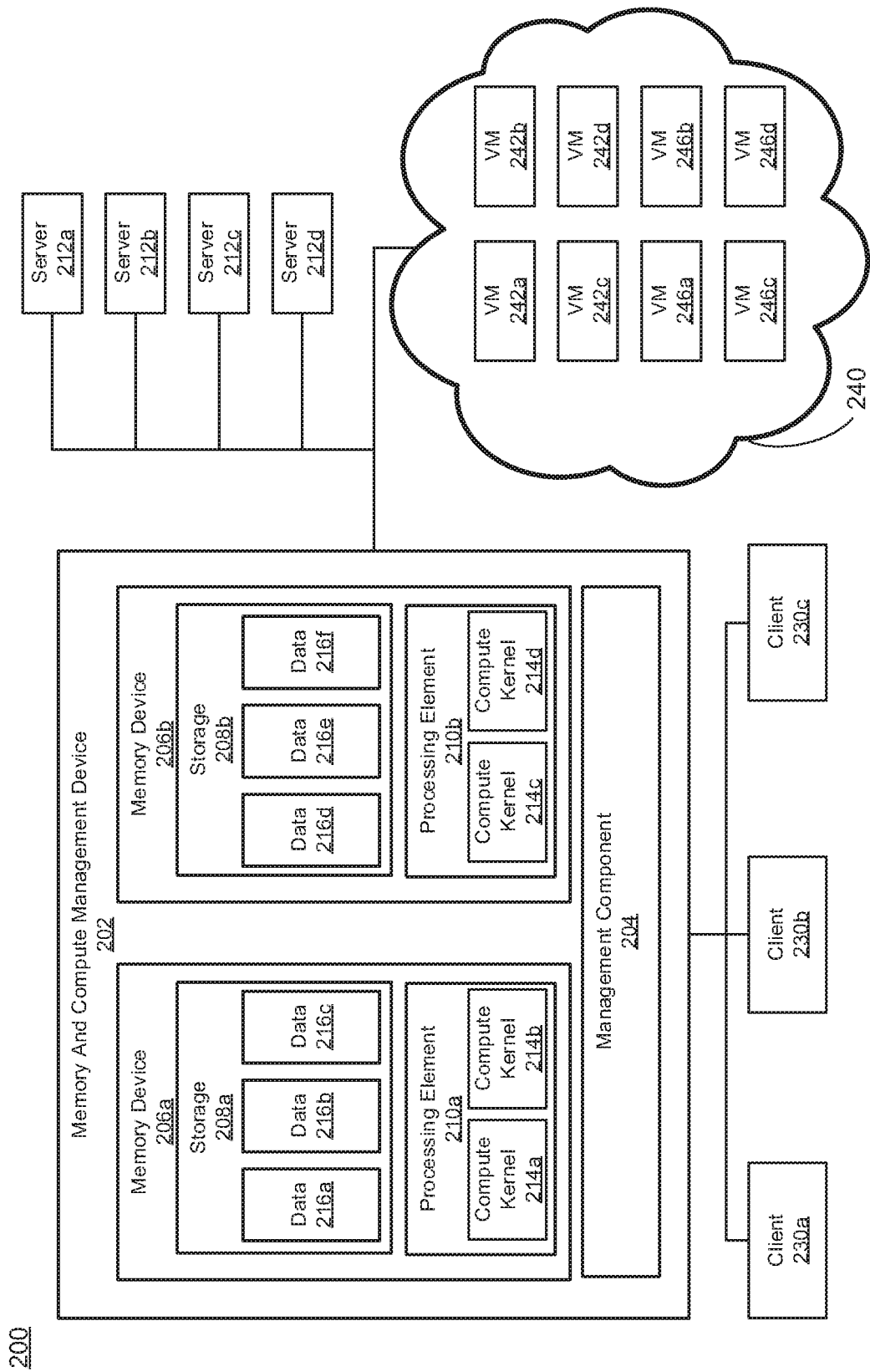
FIG. 2 shows exemplary components of a memory and compute management device, in accordance with various embodiments.

FIG. 2 shows exemplary components of a memory and compute management device, in accordance with various embodiments. FIG. 2 depicts components of a memory and compute management device 202 and other devices coupled thereto during the management and performance of compute operations including distributed compute operations. The memory and compute management device 202 can be an implementation of the memory and compute management devices 102, 302 and/or 402.

The exemplary operating environment 200 includes the memory and compute management device 202, clients 230*a-c*, servers 212*a-d* and cloud 240. The memory and compute management device 202, the clients 230*a-c*, and/or the servers 212*a-d* may be part of an enterprise, in one embodiment.

The memory and compute management device 202 includes memory devices 206*a-b* and management component 204. The memory device 206*a* includes storage 208*a* (e.g., memory modules) and processing unit 210*a*. The storage 208*a* includes data elements 216*a-c*. The processing unit 210*a* includes compute kernels 214*a-b*. The memory device 206*b* includes storage 208*b* (e.g., memory modules) and processing unit 210*b*. The storage 208*a* includes data elements 216*d-f*. The processing unit 210*b* includes compute kernels 214*c-d*. The data 216*a-f* can be received from the clients 230*a-c* and be stored in the storages 208*a-b*, the servers 212*a-d*, and/or in the cloud 240 based on determinations by the management component 204, as described herein.

The cloud 240 includes VMs 242*a-d* and 246*a-d* which execute on physical servers (not shown). It is noted that not all of the servers 242*a-d* and servers 246*a-d* may be active or have capacity to execute additional virtual machines. In one example, the servers 212*a-d* each have a memory capacity of approximately 64 GB to 128 GB while the memory and compute management device 202 may have 10-12 TB.

The memory and compute management device 202 can use local servers 212*a-d* individually, as a group, or in conjunction with one or more VMs (e.g., VMs 242*a-d* and VMs 246*a-d*) of the cloud 240 for compute operations. The memory and compute management device 202 can expand compute capacity on-the-fly or dynamically through "spinning up" (e.g., starting, initiating, etc.) VMs of the cloud 240. For example, VMs 246*a-d* may be spun up or initialized in response to signals and/or compute requests from the memory and compute management device 202. The memory and compute management device 202 can further reduce compute capacity on-the-fly or dynamically through "spinning down" (e.g., terminating, halting, etc.) VMs of the cloud 240. It should be noted that VMs represent only one of several different types of containers for scaling capacity in cloud-based systems. Other kinds of containers could also be used for dynamic capacity expansion, including but not limited to Docker containers, Linux Containers (LXC) or CoreOS containers. Any vehicle for dynamically acquiring, provisioning and configuring compute resources in the cloud is anticipated by this specification.

In some embodiments, the memory devices 206a-b are configured for accessing and manipulating linked lists which may be portions of a variety of data structures. For example, the data of storages 208a-b can include linked lists with forward and/or backward pointers. In other embodiments, memory devices are configured for accessing and manipulating other data structures commonly employed by software, including queues, stacks, arrays, trees, or graphs.

The management component 204 is configured for handling network IO and provides an interface between memory device 206a and memory device 206b. In some embodiments, the management component 204 may be a single board computer.

The memory and compute management device 202 can send executable code in languages including Java, JavaScript, C, C++, etc. It is noted that because some languages, e.g., Java and JavaScript, are sandboxed languages, executable code in these languages may be transmitted across untrusted networks. Other languages that are not sandboxed, e.g., C and C++, can be cryptographically signed to protect the code from unauthorized modification or tampering during transmission across untrusted networks. The execution of the executable code from the memory and compute management device 202 by the VMs of the cloud 240 can further provide constraints on the code.

Code or a compute kernel can be sent with some data from a memory device (e.g., 206a-b) to the servers 212a-d and/or VMs 242a-d in the cloud 240. Alternatively, if the data or a copy of the data is already present in servers 212a-d or in the cloud 240, the code can be sent over to the servers 212a-d or to VMs in the cloud 240 without sending the data. The memory and compute management device 202 can thus act as central data hub that manages and distributes data and distributes computational code. The memory and compute management device 202 can make a determination of where compute operations will occur based on the locations where the data is stored.

The memory and compute management device 202 can distribute the computational tasks based on complexity. For example, for a computationally intense compute kernel, the memory and compute management device 202 could spin up 500 VMs in the cloud 240 which could have computational capacity much greater than that of the memory and compute management device 202. The memory and compute management device 202 may thus spin up many analytical engines to run a compute job against subsets of the data and aggregate the results. The memory and compute management device 202 can thus make intelligent determinations for where computation will occur based on the complexity of the computational tasks. The memory and compute management device 202 thus allows companies to avoid provisioning internal resources for each possible situation and instead dynamically use the resources of the cloud without the need to move all resources into the cloud.

In other words, the memory and compute management device 202 can allow for combining of certain existing infrastructure with the cloud. Use of the cloud is administered by the memory and compute management device 202 based on the boundaries or limits (e.g., of usage, budget, etc.) configured in the memory and compute management device 202. Embodiments thus allow use of cloud resources in place of provisioning enterprise resources for peak capacity. Embodiments thereby allow an on-demand provisioning model thereby avoiding expenditures on resources that are unused or under used. Embodiments thus remove the capital inefficiency from traditional scaling models. Capacity planning risk is reduced substantially with regard to internal (e.g., enterprise) resources.

The servers 212a-d may be used opportunistically to augment the compute capacity of the memory and compute management device 202. For example, a subset of the data of the memory and compute management device 202 can be transmitted or shipped to the servers 212a-d along with executable code for performing a computational task associated with data shipped to the servers 212a-d. The servers 212a-d can the send the results to the memory and compute management device 202 for aggregation with other results from the cloud 240 and/or from the memory and compute management device 202. The aggregated results can then be sent to one or more of the clients 230a-c that originated a compute request to the memory and compute management device 202. The memory and compute management device 202 can thus be considered as a conductor of data movement and compute resource allocation.

The clients 230a-c can include Apache yarn nodes, Apache spark clients, and webserver clients that communicate with the management component 204 and thereby access memory devices 206a-b. In some embodiments, the clients 230a-c can send a compute request along with a compute kernel for execution as part of compute request or for reconfiguring a reconfigurable processing element. The compute kernels 214a-d can be executed by or used to reconfigure the processing elements 210a-b (e.g., FPGAs), the servers 212a-d, or portions of the cloud 240.

For example, the client 230c can send a compute request with a compute kernel to the memory and compute management device 202. Based on the compute request and compute kernel, the memory and compute management device 202 can determine that the relevant data for the compute request is data 216f and automatically determine that the compute kernel should be executed by the servers 212a-d. The memory and compute management device 202 can then send the compute kernel and the data 216f to the servers 212a-d for performance of compute request. The results can then be sent back by the servers 212a-d to the memory and compute management device 202 which can aggregate the results and send the results back to the client 230c.

As another example, the client 230a can send a compute request with a compute kernel to the memory and compute management device 202. Based on the compute request and compute kernel, the memory and compute management device 202 can determine that the relevant data for the compute request is data 216d and automatically determine that the compute request should be performed by VMs of the cloud 240. The memory and compute management device 202 can then send the compute kernel and the data 216d to the VMs 242a-d for performance of compute request. It is noted that a copy of the data 216d may already have been present in the cloud 240 and therefore may not need to be sent to the cloud 240. The memory and compute management device 202 can send a signal (e.g., cloud API) to have VMs 246a-d spun up to scale the compute capacity of the cloud 240 for increased performance to complete the compute request. The results can then be sent back by the VMs 242a-d and VMs 246a-d to the memory and compute management device 202 which can aggregate the results. The aggregated results can then be sent back to the client 230a.

Table 1 shows an example Java compute manifest with a reference to a location with executable code.

TABLE 1

Example Java compute manifest

```
{location: "http://node1/mycode.jar",
class: "MyClass",
kernels: {
        transforms: {
        map: "MyMap",
        reduce: "MyReduce"
        },
        events: {
                get_miss: "My_Get_miss",
                set: "My_Set",
                get: "My_Get",
                authenticate: "My_Authenticate"
        },
    },
}
```

Table 2 shows an example JavaScript compute manifest.

TABLE 2

Example JavaScript compute manifest

```
{location: "embedded",
kernels: {
        transforms: {
        map: function(key,value) {
                        return {newkey: key+1,
                                newvalue: value+1}
        },
        reduce: function(key,values){
                        var summ_val = 0;
                        foreach(value in values)
                                summ_val += value;
                        return {newkey: key,
                                newvalue: summ_val}
        },
    }
  }
}
```

Table 3 shows an example accelerator compute manifest.

TABLE 3

Example accelerator compute manifest

```
{location: "smc",
kernels: {
        transforms: {
        map: {name:image_resize,
                parms: {width: 20,
                        height: 20}
                }
        }
    },
}
```

Figure 3:
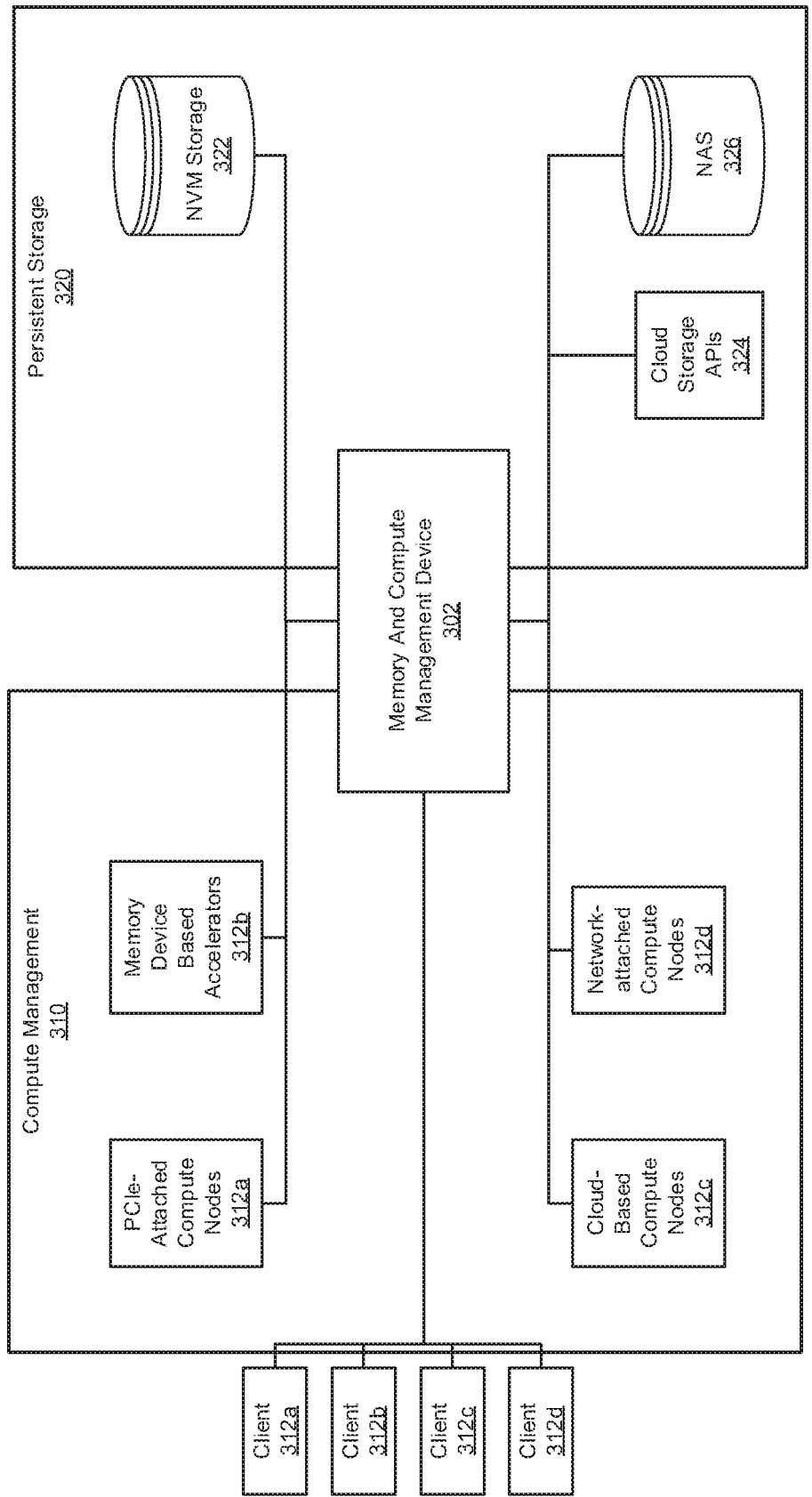
FIG. 3 shows exemplary components of an architecture for managing storage and compute operations, in accordance with various embodiments.

FIG. 3 shows exemplary components of an architecture for managing storage and compute operations. FIG. 3 depicts various components of architecture 300, for managing storage and compute operations, including compute management and persistent storage. The memory and compute management device architecture 300 includes clients 312a-d, a compute management portion 310, a persistent storage portion 320, and a memory and compute management device 302. The memory and compute management device 302 can be an implementation of the memory and compute management devices 102, 202, and/or 402.

The compute management portion 310 includes PCIe-attached compute nodes 312a, memory device based accelerators 312b, cloud-based compute nodes 312c, and network-attached compute nodes 312d. The memory and compute management device 302 spans the compute management portion 310 and the persistent storage portion 320. The persistent storage portion 320 include a Non-Volatile Memory (NVM) 322, a cloud storage APIs module 324, and Network-attached Storage (NAS) 326. The memory and compute management device 302 is coupled to the components of, the compute management 310, the persistent storage 320, and the clients 312a-d. In some embodiments, the memory and compute management device 302, the PCIe-attached compute nodes 312a, memory device based accelerators 312b, and NVM storage 322 are coupled via a PCIe bus. In some embodiments, the memory and compute management device 302, the cloud-based compute nodes 312c, the network-attached compute nodes 312d, the cloud storage APIs module 324, and the network-attached storage (NAS) 326 are coupled via Ethernet or InfiniBand.

The memory and compute management device 302 receives compute requests from the clients 312a-d. The clients 312a-d may be servers or other computing devices executing a variety of applications, client software, interfaces, or programs including, but not limited to, a graph API, Apache Yarn, Spark Resilient Distributed Dataset (RDD), and Key/Value (K/V) store. As described herein, the memory and compute management device 302 is configured to manage storage of data from the clients 312a-c to the components of the persistent storage portion 320 and manage performance of compute requests using the components of the compute management portion 310.

Figure 4:
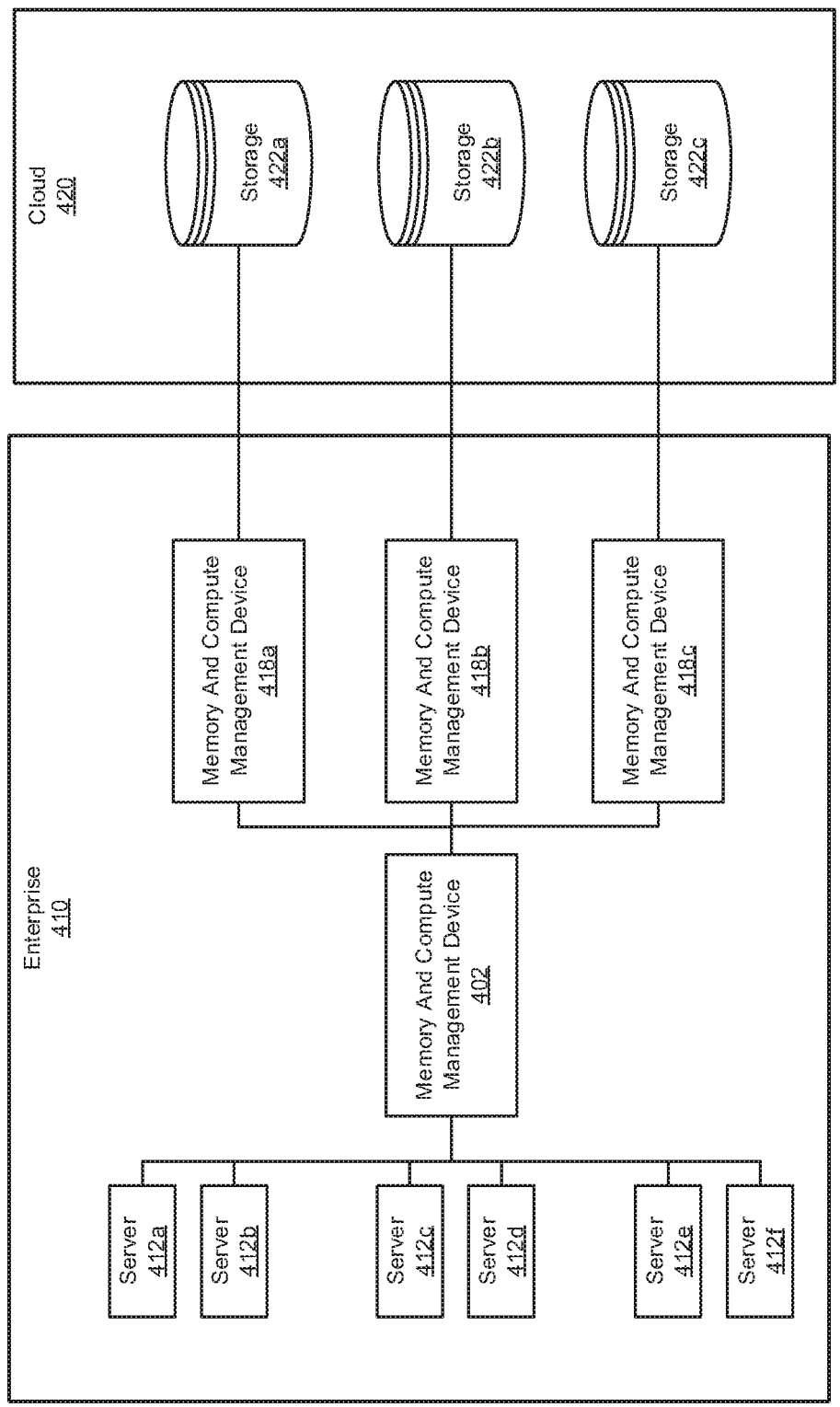
FIG. 4 shows a hierarchy with multiple memory and compute management devices, in accordance with various embodiments.

FIG. 4 shows a hierarchy with multiple memory and compute management devices, in accordance with various embodiments. FIG. 4 depicts an environment 400 including multiple memory and compute management devices 402 and 418a-c configured in a hierarchy. The environment 400 includes enterprise 410 and cloud 420. The hierarchical configurations of the memory and compute management devices 402 and 418a-c allow automatic data synchronization. The memory and compute management device 402 can be an implementation of the memory and compute management devices 102, 202, and/or 302.

The enterprise 410 includes servers 412a-f, memory and compute management device 402, and memory and compute management devices 418a-c. The servers 412a-f are coupled to the memory and compute management device 402. The servers 412a-f may be coupled to other devices not shown. The memory and compute management device 402 is coupled to the memory and compute management devices 418a-c. The memory and compute management devices 418a-c are coupled to associated storage elements 422a-c of the cloud 420. The storage elements 422a-c can include volatile storage, persistent storage, and processing elements (not shown).

In some embodiments, the memory and compute management device 402 is configured to act as a write buffer to propagate data to the memory and compute management devices 418a-c. The memory and compute management devices 418a-c may be configured as read only devices. The compute capacity of the memory and compute management devices 418a-c may thus be leveraged based on each of the memory and compute management devices 418a-c including a copy of the data. Each of the memory and compute management devices 418a-c having a copy of the data enables the compute operations to be performed in a distributed manner.

Figure 5:
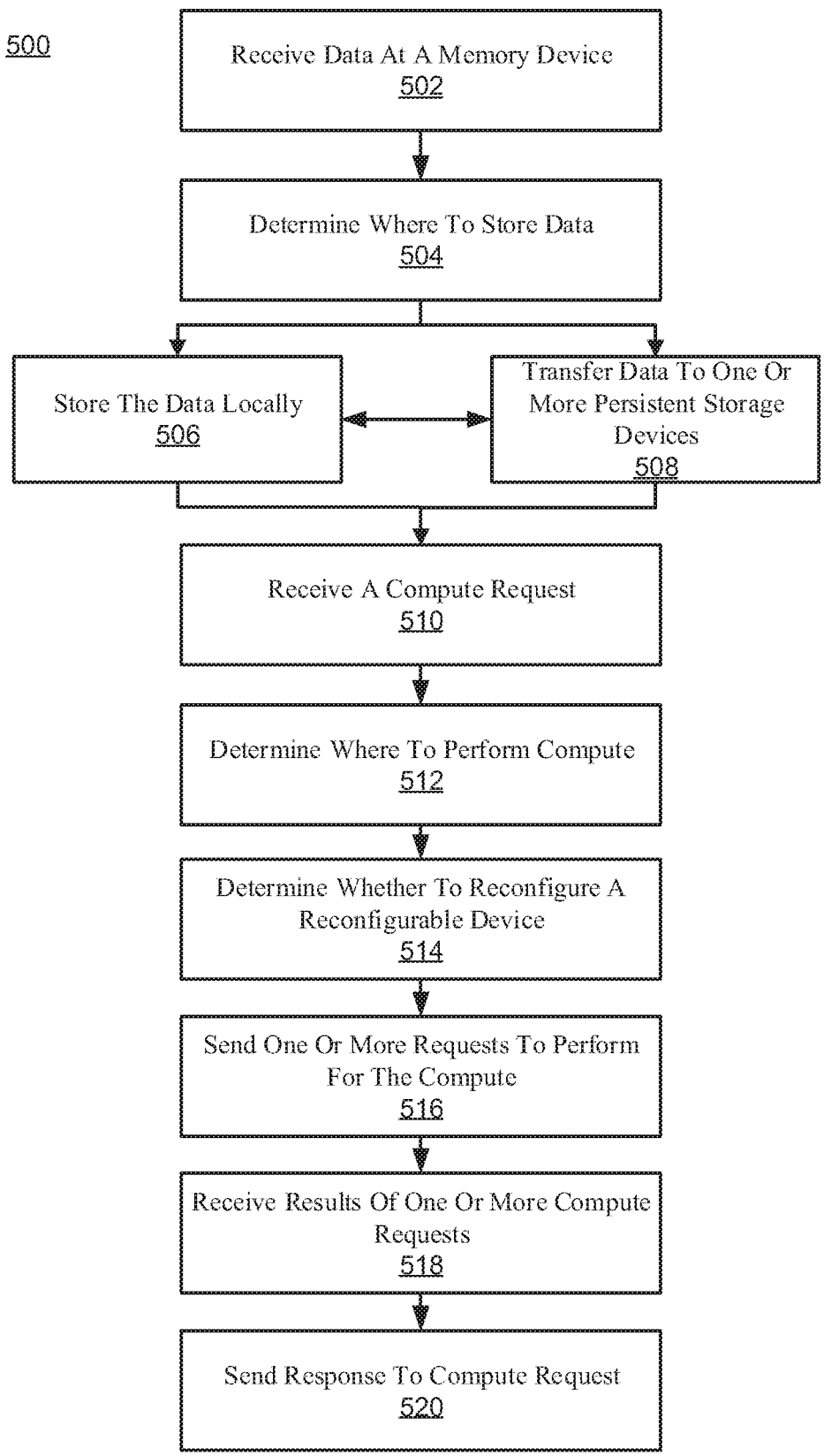
FIG. 5 shows a flowchart of an exemplary electronic component-controlled process for managing storage of data and compute operations associated with the data, in accordance with various embodiments.

FIG. 5 shows a flowchart of an exemplary electronic component-controlled process for managing storage of data and compute operations associated with the data, in accordance with various embodiments. FIG. 5 depicts a process 500 that can be performed by a memory and compute management device (e.g., the memory and compute management device 102, the memory and compute management device 202, the memory and compute management device 302, or the memory and compute management device 402), as described herein. The memory and compute management device can be a distributed computer system that includes multiple compute resources (e.g., reconfigurable hardware such as the processing elements 210a-b) and storage devices (e.g., the memory devices 206a-b).

It is noted that while one or more portions of the process 500 are described herein with reference to elements of FIGS. 1-4, such references are exemplary and portions of the process 500 can be carried out using the elements described or other elements. It is further noted that, for example, blocks 502-508 can be performed on separate hardware that is unrelated to hardware that performs block 510 and subsequent blocks. The blocks 510-520 can each be performed on respective separate pieces of hardware.

At block 502, data is received at a memory and compute management device (e.g., the memory and compute management device 102, the memory and compute management device 202, the memory and compute management device 302, or the memory and compute management device 402), as described herein. The memory and compute management device can be a memory appliance or other network appliance. The data can be part of a storage request (e.g., from the enterprise 110).

At block 504, one or more locations for storage of the data are determined. The memory and compute management device can determine whether to store the data locally or store the data in other storage (e.g., cloud storage). For example, the memory and compute management device can store the data in persistent storage that is within an enterprise that includes the memory and compute management device (e.g., the storages 208a-b), store the data offsite in enterprise offsite storage, or in one or more clouds (e.g., the cloud 120, the cloud 240, or the cloud 420). The determination of where to store the data can be based on a priority of the data. For example, data with a particular priority may be stored only in the memory and compute management device, only in the cloud, or both. It is noted that determining where to store data can be based on business rules (e.g., storage costs, cloud storage costs, etc.) or more dynamic criteria (e.g., frequency of access), in which references to specific portions of data declines as it gets moved to more remote or less performant storage.

At block 506, the data or a portion thereof is optionally stored locally. The data may be stored in memory of the memory and compute management device (e.g., in the storage 208a or the storage 208b).

At block 508, the data or a portion thereof is optionally stored in one or more persistent storage locations (e.g., the persistent storage 320). The persistent storage locations can include one or more clouds and storage devices with non-volatile memory.

At block 510, a compute request is received (e.g., from the servers 112a-f, the servers 212a-d, the clients 230a-c, or the clients 312a-d). The compute request can include data associated with the compute task. For example, the compute request can include an executable binary, actual code, reference to a location that includes executable code. The compute request can further include a file (e.g., a bit file) or a reference to a file for configuring a reconfigurable device.

At block 512, a determination of where to perform the compute request is determined. The determination of where to perform the compute request can be based on where one or more copies of the data are located. For example, the compute may be distributed between a memory and compute management device with a first copy of the data and a cloud computing resource (e.g., VMs 242a-d) with access to a second copy of the data. The compute may further be distributed based on the locations of the data relative to reconfigurable processing (e.g., FPGAs). In some embodiments, a portion of the compute is performed with a reconfigurable processing element (e.g., FPGA) of the memory and compute management device and another portion of the compute is performed with a cloud computing resources (e.g., VMs 242a-d) that are not reconfigurable processing elements (e.g., executing software, such as, a JAR file).

Embodiments are thus able to balance the amount of cloud computing resources that are used thereby customizing where the compute is performed to operate within the cloud computing budget. The memory and compute management device may be configured with cloud account information and limits on how much cloud computing capacity can be used to perform compute operations. The memory and compute management device is thus able to operate within thresholds (e.g., user configurable thresholds) to automatically scale the compute resources of one or more clouds that are used (e.g., without exceeding budgetary limitations).

At block 514, whether a reconfigurable device (e.g., the processing elements 210a-b, processing elements associated with the VMs 242a-d, or processing elements of the servers 212a-d) is to be reconfigured is determined based on the compute request. In some embodiments, a determination is made as to whether to reconfigure a reconfigurable processor (e.g., FPGA) based on the compute request and acceleration of the performance of the compute request in light of reconfiguration.

In some embodiments, the memory and compute management device maintains a data store (e.g., database or other data structure in the storages 208a-b) including bit files (e.g., for reconfiguring processing elements or performing compute requests) and the current configuration or configuration state of each reconfigurable processing element (e.g., reconfigurable processing elements of the memory and compute management device, the cloud 240, and/or the servers 212a-d). The memory and compute management device can determine a desired configuration state (e.g., FPGA configuration based on a bit file) for the compute request and determine where to perform the compute request based on a configuration state of one or more reconfigurable processing elements being determined to be in a configuration state matching the designed configuration state.

The reconfigurable processing elements of devices may further be selected based on the availability and/or the current configuration. For example, if the cloud 240 has reconfigurable processing elements configured for the compute request, the VMs 242a-d may be selected to perform the compute request over reconfigurable processing elements of the servers 212a-d which are not currently configured to perform the compute request.

The reconfigurable devices may further be selected based on the current load or activity level of the reconfigurable device. For example, if reconfigurable devices of the servers 212*a-d* are configured to perform the compute request but are currently at 75% utilization, the reconfigurable devices of the cloud 240 may be selected to be reconfigured and used to perform the compute based on available compute capacity. It is noted that there may be cases where data may be stored remotely from a memory and compute management devices but the availability and/or current configuration of remote reconfigurable processing elements results in the compute request being performed remotely from the memory and compute management device. In some embodiments, one or more idle reconfigurable devices are reconfigured with common bit files to have the idle reconfigurable devices ready for common compute requests or tasks.

For example, a compute request may be received for a large data analysis. The memory and compute management device determines that the compute request includes a large data analysis computation and determines the appropriate data analysis bit file to be used for performing the compute request. The memory and compute management device determines which reconfigurable processing elements local to the data are to be used for the compute request and current configuration of the reconfigurable processing elements (e.g., based on the data store described above). The memory and compute device sends the appropriate data analysis bit file to the reconfigurable processing elements that are closest to the relevant data or idle reconfigurable processing elements such that the reconfigurable processing elements will be reconfigured and the compute request performed.

In some embodiments, the processing elements used to perform the compute request can be based on the location of the data, the resources involved in reconfiguring the reconfigurable hardware (e.g., time and energy), the economic cost of relative resources, the availability of reconfigurable hardware resources, and spinning up or down reconfigurable hardware (e.g., locally or within the cloud such as VMs 246*a-d*). For example, determination based on the economic cost of relative resources may include the cost of cloud computing resources and cloud storage and energy costs of locally performing the compute request (e.g., within an enterprise).

At block 516, one or more requests associated with the compute request are sent by the memory and compute management device. The one or more requests to perform the compute can include requests (e.g., instructions) based on the computational resources local to particular portions of the data. In some embodiments, the request to perform the compute includes a signal to initiate or spin up a virtual machine (e.g., VMs 246*a-d*), a bit file to be used to reconfigure a processing element (e.g., reconfigurable processor), and executable code for performing the one or more computations of the compute request.

In some embodiments, the code of the compute request or the code referenced in the compute request includes services that can be accessed for subsequent compute requests. In some embodiments, the code has a global known entry point for execution that allows data to be provided in data structures which the code transforms and persists. For example, with a facial recognition compute request, the data can include each image to be used for the facial recognition process and an image to be matched. The compute task when performed then compares the image to match against each image to be used in the facial recognition until a match is found. The data and code can persist such that a new image to be matched can be sent at a later time for determining a match. This reuse of data and code can minimize network traffic and spinning up of VMs, etc.

At block 518, results of the one or more requests associated with the compute request are received (e.g., at the memory and compute management device 202). The results can be received from one or more devices of one or more computing clouds or other servers (e.g., enterprise servers, the VMs 242*a-d*, or the servers 212*a-d*).

At block 520, the response to the compute request is sent (e.g., to one or more of the clients 230*a-c*). The response can be a combination of the computation performed by the memory and compute management device and/or one or more devices of one or more clouds. In some embodiments, the memory and compute management device 202 may thus spin up many analytical engines to run a compute job against subsets of the data and aggregate the results.

Embodiments thus are able to use reconfigurable processing resources both in the memory and compute management devices and in the cloud. Embodiments are further able to scale the compute resources based on the location of the data to take advantage of the compute capacity that is near multiple copies of data. The memory and compute management device can thus manage the compute process and the locations where the compute is performed.

Figure 6:
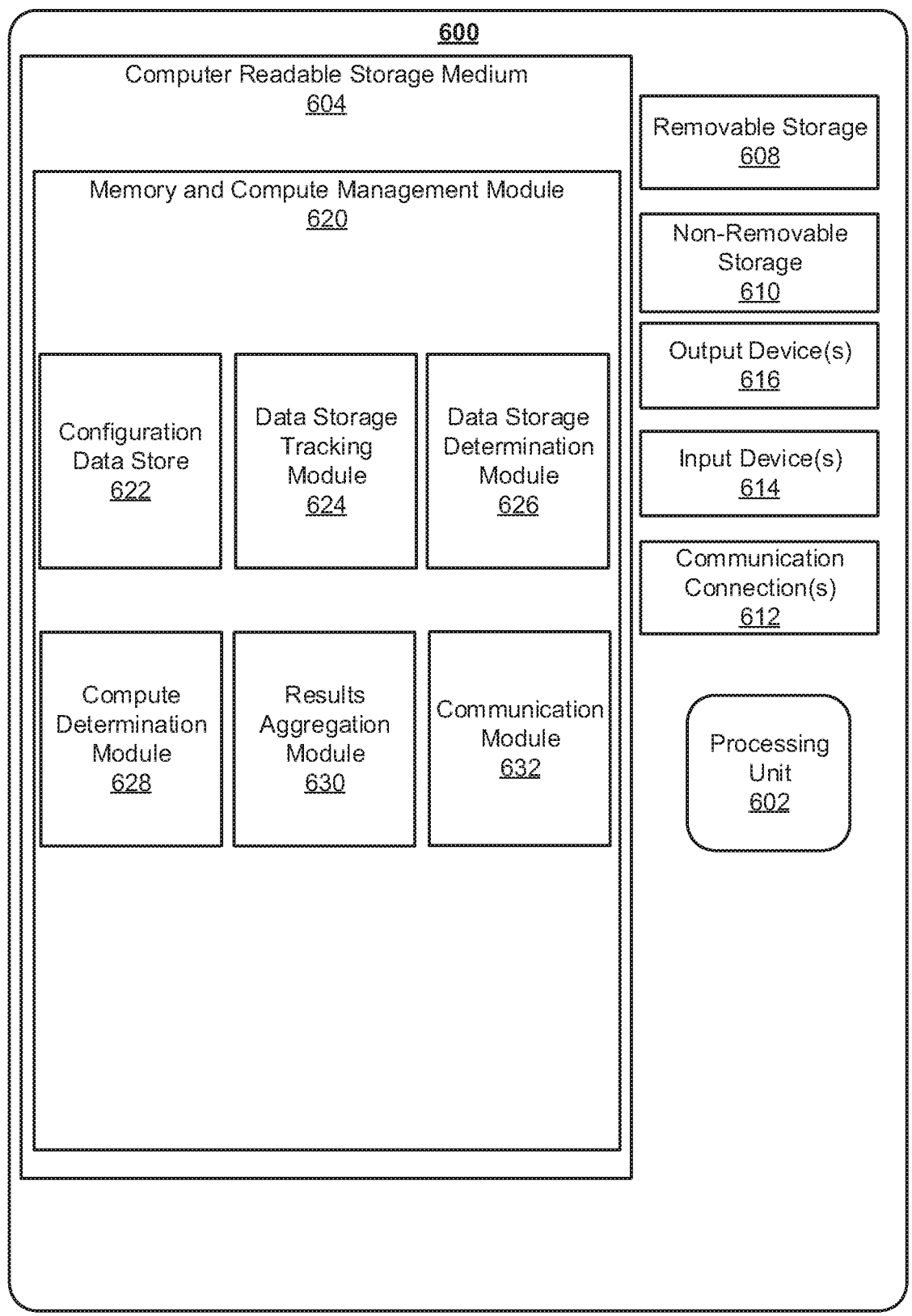
FIG. 6 shows a block diagram of an exemplary computer system platform and associated modules in accordance with various embodiments.

Referring now to FIG. 6, a block diagram of a computer system platform and associated modules in accordance with various embodiments is shown. With reference to FIG. 6, example system modules for implementing the embodiments described above, such as those described in FIGS. 1-5, are disclosed. The system includes a general purpose computing system environment, such as computing system environment 600. The computing system environment 600 may include servers, desktop computers, laptops, tablets, mobile devices, and smartphones, etc. The computing system environment 600 typically includes at least one processing unit 602 and computer readable storage medium 604. Depending on the exact configuration and type of computing system environment, computer readable storage medium 604 is volatile (such as RAM), non-volatile (such as ROM, flash memory, etc.) or some combination of the two. Portions of computer readable storage medium 604 when executed may perform method of protecting one or more regions of memory, as described herein.

Additionally in various embodiments, the computing system environment 600 may also have other features/functionalities. For example, the computing system environment 600 may also include additional storage (removable and/or non-removable) including, but not limited to, magnetic or optical disks or tape. Such additional storage is illustrated by removable storage 608 and non-removable storage 610. Computer storage media includes volatile and nonvolatile, removable and non-removable media implemented in any method or technology for storage of information such as computer readable instructions, data structures, program modules or other data. Computer readable medium 604, removable storage 608 and nonremovable storage 610 are all examples of computer storage media. Computer storage media includes, but is not limited to, RAM, ROM, EEPROM, flash memory or other memory technology, expandable memory (e.g. USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by the computing system environment 600. Any such computer storage media is part of the computing system environment 600.

The computing system environment 600 may also contain communications connection(s) 612 that allow it to communicate with other devices. Communications connection(s) 612 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Communications connection(s) 612 may allow the computing system environment 600 to communicate over various networks types including, but not limited to, fibre channel, small computer system interface (SCSI), Bluetooth, Ethernet, Wi-Fi, Infrared Data Association (IrDA), Local area networks (LAN), Wireless Local area networks (WLAN), wide area networks (WAN) such as the internet, serial, and universal serial bus (USB). It is appreciated the various network types that the communication connection(s) 612 connect to may run a plurality of network protocols including, but not limited to, transmission control protocol (TCP), user datagram protocol (UDP), Internet Protocol (IP), real-time transport protocol (RTP), real-time transport control protocol (RTCP), file transfer protocol (FTP), and hypertext transfer protocol (HTTP), etc.

In further embodiments, the computing system environment 600 may also have input device(s) 614 such as a keyboard, mouse, a terminal or terminal emulator (either directly connected or remotely accessible via telnet, SSH, HTTP, SSL, etc.), a pen, voice input device, touch input device, a remote control, etc. Output device(s) 616 such as a display, speakers, LEDs, etc., may also be included.

The computer readable storage medium 604 includes a memory and compute management module 620. The memory and compute management module 620 may be executed by a memory and compute management device described above. The memory and compute management module 620 includes a configuration data store 622, a data storage tracking module 624, a data storage determination module 626, a compute determination module 628, a results aggregation module 630, and communication module 632.

The configuration data store 622 includes configuration data for the use of cloud storage and cloud computing resources which may include thresholds or limits for storage and computations. The configuration data can be based on cloud storage budgets and cloud computing budgets. The data storage tracking module 624 is configured for tracking the locations where data is stored (e.g., locally or in one or more clouds), as described herein. The data storage determination module 626 is configured for determining where data is to be stored or propagated, e.g., locally and/or to one or more clouds, based on the cloud storage configuration, as described herein.

The compute determination module 628 is configured for determining where compute operations are to occur, e.g., locally and/or in one or more clouds, based on the cloud computing configuration, local resources, and cloud resources, as described herein. The results aggregation module 630 is configured for aggregating computation results received from servers, cloud computing resources, etc. The communication module 632 is configured for receiving one or more compute requests from a client, sending one or more requests associated with the compute requests to one or more clouds, servers, etc., and receiving results of the one or more requests associated with the compute requests from the one or more clouds, servers, etc., and sending the results (e.g., aggregated results) to the client.

Figure 7:
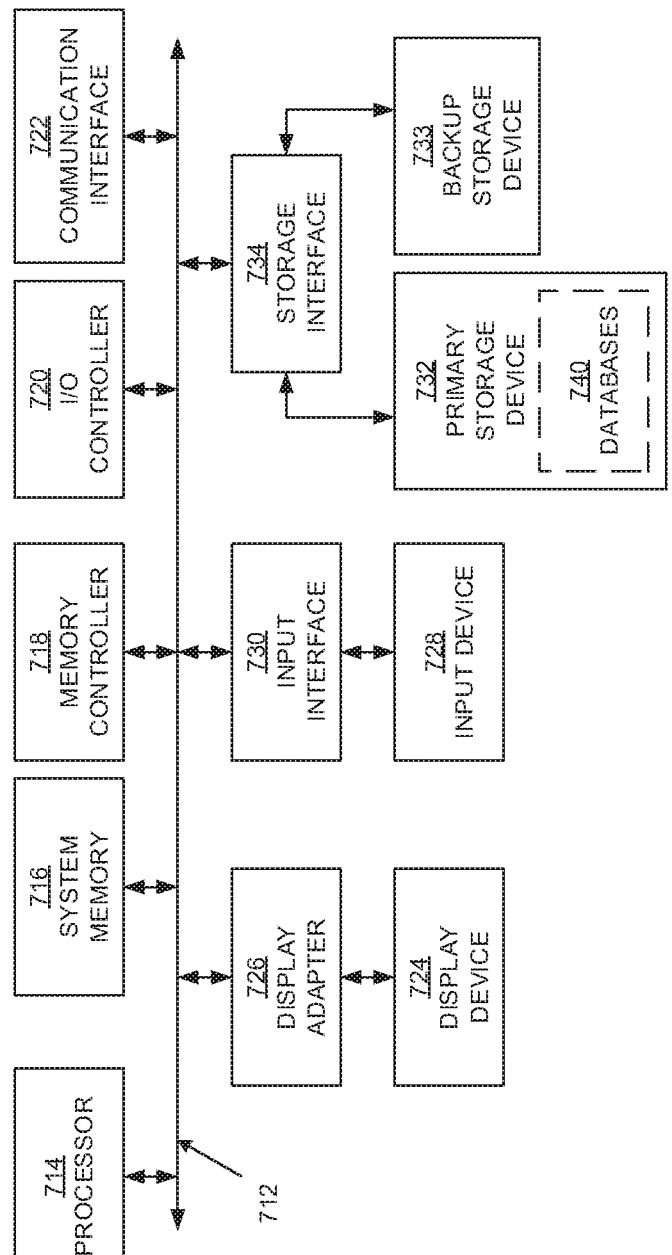
FIG. 7 shows a block diagram of an exemplary computer system platform in accordance with various embodiments.

FIG. 7 is a block diagram of an exemplary computing system 700 including various embodiments. Computing system 700 broadly represents any single or multi-processor computing device or system capable of executing computer-readable instructions. Examples of computing system 700 include, without limitation, workstations, laptops, client-side terminals, servers, supercomputers, distributed computing systems, handheld devices, or any other computing system or device. In its most basic configuration, computing system 700 may include at least one processor 714 and a system memory 716. The computing system may be configured to function as a memory and compute management device (e.g., the memory and compute management devices 102, 202, 302, and 402).

Processor 714 generally represents any type or form of processing unit capable of processing data or interpreting and executing instructions. In certain embodiments, processor 714 may receive instructions from a software application or module. These instructions may cause processor 714 to perform the functions of one or more of the example embodiments described and/or illustrated herein. For example, processor 714 may perform and/or be a means for performing, either alone or in combination with other elements, one or more of the receiving, determining, storing, transferring, sending, shipping, signaling, and providing described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, RAM, ROM, FLASH memory, or any other suitable memory device. Although not required, in certain embodiments computing system 700 may include both a volatile memory unit (such as, for example, system memory 716) and a non-volatile storage device (such as, for example, primary storage device 732.

Computing system 700 may also include one or more components or elements in addition to processor 714 and system memory 716. For example, in the embodiment of FIG. 7, computing system 700 includes a memory controller 718, an I/O controller 720, and a communication interface 722, each of which may be interconnected via a communication infrastructure 712.

Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network. In one embodiment, system memory 716 communicates via a dedicated memory bus.

Memory controller 718 generally represents any type or form of device capable of handling memory or data or controlling communication between one or more components of computing system 700. For example, memory controller 718 may control communication between processor 714, system memory 716, and I/O controller 720 via communication infrastructure 712. Memory controller may perform and/or be a means for performing, either alone or in combination with other elements, one or more of the operations or features described herein.

I/O controller 720 generally represents any type or form of module capable of coordinating and/or controlling the input and output functions of a computing device. For example, I/O controller 720 may control or facilitate transfer of data between one or more elements of computing system 700, such as processor 714, system memory 716, communication interface 722, display adapter 726, input interface 730, and storage interface 734. I/O controller 720 may be used, for example, to perform and/or be a means for performing, either alone or in combination with other elements, one or more of the operations described herein. I/O controller 720 may also be used to perform and/or be a means for performing other operations and features set forth in the instant disclosure.

Communication interface 722 broadly represents any type or form of communication device or adapter capable of facilitating communication between example computing system 700 and one or more additional devices. For example, communication interface 722 may facilitate communication between computing system 700 and a private or public network including additional computing systems. Examples of communication interface 722 include, without limitation, a wired network interface (such as a network interface card), a wireless network interface (such as a wireless network interface card), a modem, and any other suitable interface. In one embodiment, communication interface 722 provides a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

Communication interface 722 may also represent a host adapter configured to facilitate communication between computing system 700 and one or more additional network or storage devices via an external bus or communications channel. Examples of host adapters include, without limitation, SCSI host adapters, USB host adapters, IEEE (Institute of Electrical and Electronics Engineers) 794 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 722 may also allow computing system 700 to engage in distributed or remote computing. For example, communication interface 722 may receive instructions from a remote device or send instructions to a remote device for execution. Communication interface 722 may perform and/or be a means for performing, either alone or in combination with other elements, one or more of the operations disclosed herein. Communication interface 722 may also be used to perform and/or be a means for performing other operations and features set forth in the instant disclosure.

As illustrated in FIG. 7, computing system 700 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, computing system 700 may also include at least one input device 728 coupled to communication infrastructure 712 via an input interface 730. Input device 728 generally represents any type or form of input device capable of providing input, either computer- or human-generated, to computing system 700. Examples of input device 728 include, without limitation, a keyboard, a pointing device, a speech recognition device, or any other input device. In one embodiment, input device 728 may perform and/or be a means for performing, either alone or in combination with other elements, one or more of the operations disclosed herein. Input device 728 may also be used to perform and/or be a means for performing other operations and features set forth in the instant disclosure.

As illustrated in FIG. 7, computing system 700 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state disk, a floppy disk drive, a magnetic tape drive, an optical disk drive, a FLASH drive, or the like. Storage interface 734 generally represents any type or form of interface or device for transferring data between storage devices 732 and 733 and other components of computing system 700.

In one example, databases 740 may be stored in primary storage device 732. Databases 740 may represent portions of a single database or computing device or a plurality of databases or computing devices. For example, databases 740 may represent (be stored on) a portion of computing system 700 and/or portions of a network architecture. The databases 740 can include bit files (e.g., for reconfiguring processing elements or performing compute requests) or reference to bit files and the current configuration or configuration state of each reconfigurable processing element (e.g., reconfigurable processing elements of the memory and compute management device, the cloud 240, and/or the servers 212a-d). Alternatively, databases 740 may represent (be stored on) one or more physically separate devices capable of being accessed by a computing device, such as computing system 700.

Continuing with reference to FIG. 7, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a FLASH memory device, or the like. Storage devices 732 and 733 may also include other similar structures or devices for allowing computer software, data, or other computer-readable instructions to be loaded into computing system 700. For example, storage devices 732 and 733 may be configured to read and write software, data, or other computer-readable information. Storage devices 732 and 733 may also be a part of computing system 700 or may be separate devices accessed through other interface systems.

Storage devices 732 and 733 may be used to perform, and/or be a means for performing, either alone or in combination with other elements, one or more of the operations disclosed herein. Storage devices 732 and 733 may also be used to perform, and/or be a means for performing, other operations and features set forth in the instant disclosure.

Many other devices or subsystems may be connected to computing system 700. Conversely, all of the components and devices illustrated in FIG. 7 need not be present to practice the embodiments described herein. The devices and subsystems referenced above may also be interconnected in different ways from that shown in FIG. 7. Computing system 700 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 700. All or a portion of the computer program stored on the computer-readable medium may then be stored in system memory 716 and/or various portions of storage devices 732 and 733. When executed by processor 714, a computer program loaded into computing system 700 may cause processor 714 to perform and/or be a means for performing the functions of the example embodiments described and/or illustrated herein. Additionally or alternatively, the example embodiments described and/or illustrated herein may be implemented in firmware and/or hardware. For example, computing system 700 may be configured as an ASIC adapted to implement one or more of the embodiments disclosed herein.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A system for managing computation in a computer infrastructure, the system comprising:
    a plurality of memory modules; and
    a processor coupled to the plurality of memory modules and configured to:
        receive a compute request at a distributed computer system which includes multiple compute resources and storage devices, wherein at least one of the compute resources includes reconfigurable hardware, the compute request specifying a desired configuration state of the reconfigurable hardware;
        determine, in order to fulfill the compute request, a first compute resource to use from the multiple compute resources and whether to reconfigure the reconfigurable hardware of the first compute resource, the determination being made based at least in part on a configuration state of the reconfigurable hardware of the first compute resource matching the desired configuration state for the compute request and on a first activity level of the reconfigurable hardware of the first compute resource being lower than a second activity level of reconfigurable hardware of a second compute resource of the multiple compute resources, wherein the first activity level comprises a first amount of utilization of the reconfigurable hardware of the first compute resource, and wherein the second activity level comprises a second amount of utilization of the reconfigurable hardware of the second compute resource;
        reconfigure the reconfigurable hardware of the first compute resource to match the desired configuration state; and
        send instructions to the first compute resource to carry out the compute request.

2. The system of claim 1, wherein the storage devices comprise local storage and cloud storage, and wherein the processor is further configured to:
    receive data;
    determine whether to store the data in at least one of the local storage or the cloud storage; and
    store the data to the at least one of the local storage or the cloud storage.

3. The system of claim 1, wherein the processor is further configured to:
    receive results from the one more requests associated with the compute request; and
    send a response to the compute request.

4. The system of claim 1, wherein the processor is further configured to:
    maintain a list of configuration states of at least two of the multiple compute resources with reconfigurable hardware;
    determine the desired configuration state for the compute request; and
    wherein the determination of which compute resource to use and whether to reconfigure the reconfigurable hardware of the compute resource includes accessing the list of configuration states and determining whether any of the configuration states match the desired configuration state.

5. The system of claim 1, wherein the at least one of the compute resources including reconfigurable hardware is a Field Programmable Gate Array (FPGA) and the configuration state is a bit file for configuring hardware of the FPGA.

6. The system of claim 5, wherein the processor is further configured to:
    maintain a database of available bit files for the FPGA; and wherein the determination of which compute resource to use and whether to reconfigure the reconfigurable hardware of the first compute resource includes identifying a bit file from the maintained database of available bit files for the FPGA to be used in carrying out the compute request.

7. The system of claim 1 wherein the determination of which compute resource to use and whether to reconfigure the reconfigurable hardware of the first compute resource comprises assessing at least one of location of the data, resources involved in reconfiguring the reconfigurable hardware of the first compute resource, economic cost of relative resources, availability of reconfigurable hardware resources, or initializing or terminating execution on the reconfigurable hardware of the first compute resource.

8. The system of claim 1, wherein the processor is further configured to:
- compare the first amount of utilization to the second amount of utilization to determine whether the first amount of utilization is lower than the second amount of utilization; and
- select the first compute resource to use in response to the first amount of utilization being lower than the second amount of utilization.

9. A system comprising:
- a reconfigurable processor;
- a plurality of memory modules; and
- a processor configured to:
  - determine a plurality of storage locations for data in the plurality of memory modules and a cloud storage;
  - track the plurality of locations used for storing the data;
  - determine where to perform computations based on the plurality of locations used for storing the data;
  - determine whether to reconfigure the reconfigurable processor based at least in part on whether a configuration state of the reconfigurable processor matches a desired configuration state for a plurality of compute requests and on whether a first activity level of the first reconfigurable processor is lower than a second activity level of a cloud computing resource, wherein the first activity level comprises a first amount of utilization of the reconfigurable processor, and wherein the second activity level comprises a second amount of utilization of the cloud computing resource;
  - send the plurality of compute requests to at least one of the first reconfigurable processor or the cloud computing resource based on a determination of where to perform computations and on an availability of the cloud computing resource; and
  - aggregate responses to the plurality of compute requests.

10. The system of claim 9, wherein the plurality of compute requests comprises an image for reconfiguring the reconfigurable processor.

11. The system of claim 9, wherein the processor is also configured to determine where to perform the computations based on the configuration state of the reconfigurable processor and wherein the plurality of locations used for storing the data is based on a configuration for use of cloud storage.

12. The system of claim 9, wherein the plurality of compute requests comprises a signal to initiate a plurality of virtual machines (VMs) to scale compute capacity of the computing cloud.

13. The system of claim 9, wherein the plurality of compute requests comprises a signal to initiate one or more containers to scale compute capacity of the computing cloud.

14. The system of claim 9, wherein the plurality of compute requests comprises executable code.

15. The system of claim 9, wherein the processor is also configured to determine where to perform the computation based on locations of one or more reconfigurable processors within the computing cloud.

16. The system of claim 9, wherein the data is duplicated in the plurality of memory modules and the cloud storage.

17. A method for managing distributed computing, the method comprising:
- receiving data at a device comprising a plurality of memory modules;
- determining whether to store the data in at least one of the plurality of memory modules and a cloud storage;
- storing the data to at least one of the plurality of memory modules or a cloud storage;
- receiving a compute request, the compute request specifying a desired configuration state of a first reconfigurable processor;
- determining where to perform the compute request based on a location of the data;
- determining whether to configure the first reconfigurable processor based at least in part on whether a configuration state of the first reconfigurable processor matches the desired configuration state for the compute request and on whether a first activity level of the first reconfigurable processor is lower than a second activity level of a second reconfigurable processor, wherein the first activity level comprises a first amount of utilization of the first reconfigurable processor, and wherein the second activity level comprises a second amount of utilization of the second reconfigurable processor;
- sending one or more requests associated with the compute request, wherein the one or more requests associated with the compute request are configured to distribute computations for the compute request based on one or more locations of data associated with the compute request, and wherein the one or more requests comprise an image for configuring the first reconfigurable processor for performing the compute request;
- receiving results from the one more requests to perform the compute request; and
- sending a response to the compute request.

18. The method of claim 17, wherein the one or more requests associated with the compute request comprise a signal to scale a compute capacity of cloud computing resources.

19. The method of claim 17, wherein the one or more requests associated with the compute request comprises a signal to initiate a plurality of virtual machines (VMs) to scale compute capacity of cloud computing resources.

20. The method of claim 17, wherein the one or more requests associated with the compute request comprise executable code.

* * * * *